(12) United States Patent
Noebel

(10) Patent No.: US 8,640,990 B2
(45) Date of Patent: Feb. 4, 2014

(54) CIRCUMFERENTIAL STIFFENER FOR AN AIRCRAFT FUSELAGE

(75) Inventor: Torsten Noebel, Neuendeich (DE)

(73) Assignee: Airbus Operations GmbH, Hamburg (DE)

(*) Notice: Subject to any disclaimer, the term of this patent is extended or adjusted under 35 U.S.C. 154(b) by 262 days.

(21) Appl. No.: 13/097,237

(22) Filed: Apr. 29, 2011

(65) Prior Publication Data
US 2011/0290939 A1    Dec. 1, 2011

Related U.S. Application Data

(60) Provisional application No. 61/329,575, filed on Apr. 30, 2010.

(30) Foreign Application Priority Data

Apr. 30, 2010 (DE) .......... 10 2010 018 932

(51) Int. Cl.
*B64C 1/00* (2006.01)
*B64C 1/12* (2006.01)

(52) U.S. Cl.
USPC .......................................... 244/119; 244/132

(58) Field of Classification Search
USPC .............................. 244/119, 123.1, 132
See application file for complete search history.

(56) References Cited

U.S. PATENT DOCUMENTS

| | | | | |
|---|---|---|---|---|
| 6,766,984 | B1* | 7/2004 | Ochoa | 244/119 |
| 7,325,771 | B2 | 2/2008 | Stulc | |
| 8,047,465 | B2* | 11/2011 | Payen | 244/17.11 |
| 8,079,549 | B2* | 12/2011 | Gouvea | 244/119 |
| 2008/0023583 | A1* | 1/2008 | Payen | 244/17.11 |
| 2009/0320398 | A1* | 12/2009 | Gouvea | 52/309.1 |
| 2010/0308172 | A1* | 12/2010 | Depeige | 244/132 |

* cited by examiner

*Primary Examiner* — Philip J Bonzell
(74) *Attorney, Agent, or Firm* — Leydig, Voit & Mayer, Ltd.

(57) ABSTRACT

A circumferential stiffener configured for a fuselage of an aircraft includes a web disposed at an angle to a normal axis of the circumferential stiffener, at least one inner flange, at least one outer flange and an integral angle profile configured for connection to a skin section of the fuselage.

9 Claims, 1 Drawing Sheet

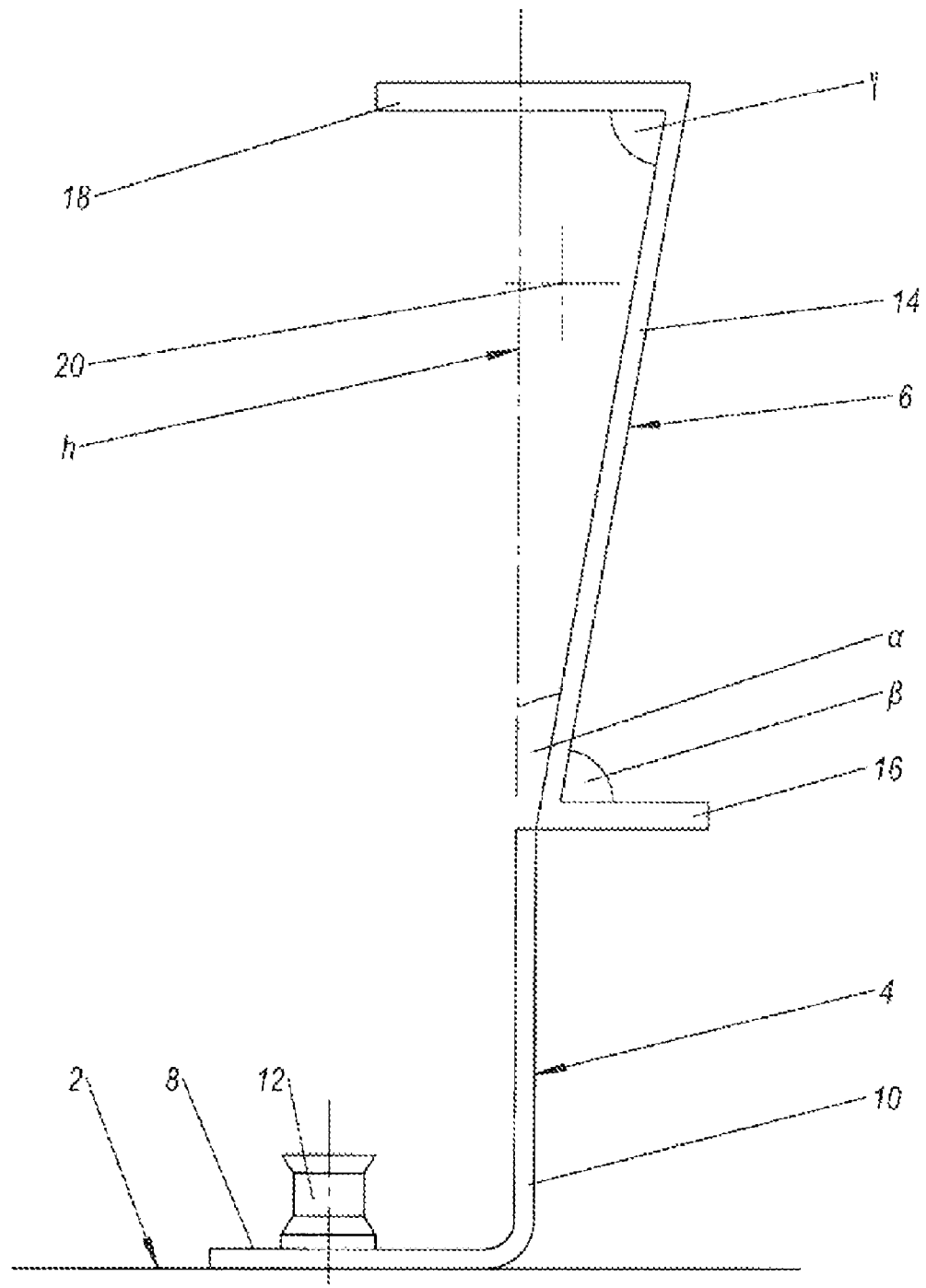

CIRCUMFERENTIAL STIFFENER FOR AN AIRCRAFT FUSELAGE

CROSS REFERENCE TO RELATED APPLICATIONS

This application claims priority to U.S. Provisional Patent Application No. 61/329,575, filed Apr. 30, 2010 and German Patent Application No. DE 10 2010 018 932.4, filed Apr. 30, 2010, both of which are incorporated by reference herein in their entireties.

FIELD

The present invention relates to a circumferential stiffener for the fuselage of an aircraft.

BACKGROUND

Circumferential stiffeners, or frames, serve in particular to provide stiffening of an aircraft fuselage, for example, an aeroplane fuselage, in the circumferential direction. Conventional frames are usually designed as C- or Z-profiles with a web, from which extend an inner flange and an outer flange, and are connected via a shear comb or clip with a skin section of the fuselage. In addition the frames are usually supported in each case via brackets or cleats on a foot section of longitudinal stiffeners, or stringers, which are designed to prevent any lateral buckling of the frames at high-pressure loadings, in particular on the inner flange. Connection of the shear combs and the brackets to the frames, and also to the skin sections or foot sections, conventionally takes place via rivets. What is disadvantageous concerning this method of frame connection is in particular the high number of individual parts, i.e. the shear combs, brackets and rivets, and the complex assembly that thereby results, as well as the relatively high fuselage weight.

A frame connection without brackets is shown in the U.S. Pat. No. 7,325,771. For this purpose the frames are designed with a symmetrical C-profile as fiber reinforced composite components and are connected solely via shear combs to plane connecting surfaces on the fuselage; the latter are formed in each case from lengthwise contiguous foot sections of adjacent longitudinal stiffeners. In particular in the case of fiber reinforced composite frames that are optimized for weight and thus asymmetrical, whose flanges have different lengths and/or thicknesses, prevention of lateral buckling of the frames at high pressure loadings on the inner flange cannot however be achieved with this solution. Moreover shear combs continue to be required for purposes of connecting the frames.

SUMMARY

An aspect of the present invention is to create a circumferential stiffener for a fuselage of an aircraft, which avoids the disadvantages cited above and is stabilized against lateral buckling.

In an embodiment, the present invention provides a circumferential stiffener configured for a fuselage of an aircraft including a web disposed at an angle to a normal axis of the circumferential stiffener, at least one inner flange, at least one outer flange and an integral angle profile configured for connection to a skin section of the fuselage.

BRIEF DESCRIPTION OF THE DRAWINGS

Exemplary embodiments of the present invention are described in more detail below with reference to the drawing, in which:

FIG. 1 shows a cross-section through a circumferential stiffener in accordance with an embodiment of the invention.

DETAILED DESCRIPTION

A circumferential stiffener in accordance with an embodiment of the invention for a fuselage of an aircraft, in particular of an aeroplane, has a web and at least one inner flange and one outer flange. The circumferential stiffener has an angle profile designed integrally with the web for purposes of connecting to a skin section of the fuselage. Moreover, the web is set at an angle to the normal axis of the circumferential stiffener.

By virtue of the integral design of the angle profile with the web separate shear combs can be completely dispensed with. As a result of the inclined position of the web relative to the circumferential stiffener, the location of the shear center is laterally displaced, as a result of which any lateral buckling of the profile is effectively prevented, even with different designs for the inner and outer flanges, such that separate brackets can be dispensed with, and the circumferential stiffener has a very high level of stability against buckling. In the connected state the web no longer extends at right angles to the particular skin section of the fuselage accommodating the circumferential stiffener, but rather is inclined. Thus not only can the connecting of the shear combs to the circumferential stiffener be dispensed with, but also moreover the use of brackets, so that the assembly compared with the conventional solutions is radically simplified and optimized in terms of time. Here the circumferential stiffeners can be manufactured both in a metal form of construction and also in a fiber-reinforced composite form of construction. The previous geometrical profiles of the circumferential stiffeners are translated into more practical profiles.

In particular the circumferential stiffener is stabilized against buckling if the flanges extend parallel to the particular skin section of the fuselage, and thus are set at an angle≠90° to the web. Here its particular profile is preferably selected to comply with the loads that are anticipated. Thus in principle in addition to a C-profile a multiplicity of different profiles is conceivable.

For example, the circumferential stiffener can be embodied as a Z-profile, whose inner flange points in an opposite direction to the outer flange.

Similarly, the circumferential stiffener can be embodied as an E-profile with a central flange that is arranged between the inner flange and the outer flange. The central flange effects an additional reinforcement of the web and extends preferably parallel to the outer flange and the inner flange and in the same direction, and thus parallel to the particular skin section of the fuselage. At the same time the central flange can effect a reduction in the thickness of the material and/or a lateral shortening of at least one of the other two flanges.

In particular embodiments of the invention allow the use of flanges of differing lateral extent and thickness, so that in spite of differing stiffnesses of the flanges a lateral buckling of the circumferential stiffener is reliably prevented.

The angle profile can have a foot plate and an arm extending orthogonally at right angles from the latter, which is designed integrally with the web, which in one embodiment is oriented away from the foot plate. By this means the shear center as viewed in the lateral direction is positioned between the surface center of gravity of the foot plate and that of the web, which effects an additional stabilization of the circumferential stiffener.

A circumferential stiffener 1 in accordance with an embodiment of the invention for purposes of stiffening an outer skin 2 of an aeroplane fuselage of the circumferential direction y has an angle profile 4 and a stiffening profile 6. The circumferential stiffener 1 can be designed as a single ring mapping a fuselage cross-section, or as an individual ring segment, which with a multiplicity of further ring segments forms a closed ring. The angle profile 4 and the stiffening section 6 consist preferably of a fiber-reinforced composite material, for example, a carbon fiber-reinforced plastic (CFRP) and are integrally connected with one another, i.e. as one piece, and are thus produced in a common manufacturing process.

The angle profile 4 has a foot plate 8 for purposes of connecting to an outer skin section and an arm 10 extending orthogonally at right angles from the foot plate 8, which extends radially from the fuselage, i.e. from the outer skin section, and whose free end section translates into the stiffening profile 6. The foot plate 8 is for example attached to the outer skin section via a multiplicity of connecting elements, such as rivets 12, arranged adjacent to one another in the circumferential direction y. In addition an adhesive agent can be arranged between the foot plate 8 and the outer skin section. Similarly, the foot plate 8 can be welded or bonded onto the outer skin 2 without connecting elements, for example in an autoclave process using a thermosetting material matrix, or in an appropriate press process using a thermoplastic material matrix.

The stiffening profile 6 has a web 14, an outer flange 16, and also an inner flange 18. The web 14 is set at a web angle $\alpha$ relative to the normal axis h of the circumferential stiffener 1, which extends radially from the fuselage, i.e. from the outer skin section, in a direction facing away from the foot plate 8 such that the web 14 does not extend at right angles to the outer skin section and the shear center 20 of the circumferential stiffener 1 is displaced laterally relative to conventional Z-shaped frames, i.e. along the aeroplane longitudinal axis x. In particular the shear center 20 is displaced in the opposite direction to the flight direction along the aeroplane longitudinal axis x, so that it is positioned between a surface center of gravity of the foot plate 8, and that of the web 14.

The flanges 16, 18 are orientated at right angles to the normal axis h. They run parallel to one another and in particular parallel to the outer skin section 2. They are arranged at the ends of the web 14, and extend in opposite directions, wherein the inner flange 18 extends in the flight direction and the outer flange 16 extends in a direction opposite to the flight direction along the aeroplane longitudinal axis x. The flanges 16, 18, have a load-optimized extent in the direction of the normal axis h, and thus a load-optimized material thickness. Similarly they have a load-optimized lateral extent in the x-direction. In the preferred embodiment shown the outer flange 16 is designed to be laterally shortened relative to the inner flange 18, but with the same material thickness.

The outer flange 16 is arranged in the region of the free end section of the orthogonal arm 10 and is set at an outer flange angle $\beta<90°$ relative to the web 14.

The inner flange 18 is set at an inner flange angle $\gamma$ relative to the web 14, wherein by virtue of the parallel nature of the two flanges 16, 18 the equation $\beta=\gamma$ applies. Thus the stiffening profile 6 by virtue of the differing flange geometries forms an asymmetric Z-profile and moreover, by virtue of the displaced shear center 20, in particular a practical Z-profile, which even despite the different flange geometries does not become unstable at high pressure loadings, in particular onto the inner flange 16.

Thus, in an embodiment, the present invention provides a circumferential stiffener for a fuselage of an aircraft, in particular of an aeroplane, which has a stiffening section with a web, from which at least one inner flange and one outer flange extend, wherein an integral angle profile is provided for purposes of connecting to a skin section of the fuselage, and the web is set at an angle to the normal axis of the circumferential stiffener.

While the invention has been particularly shown and described with reference to preferred embodiments thereof, it will be understood by those skilled in the art that various changes in form and details may be made therein without departing from the spirit and scope of the invention.

REFERENCE SYMBOL LIST

1 Circumferential stiffener
2 Outer skin
4 Angle profile
6 Stiffener profile
8 Foot plate
10 Orthogonal arm
12 Rivet
14 Web
16 Outer flange
18 Inner flange
20 Shear center
h Normal axis
x Aeroplane longitudinal axis
y Circumferential direction
$\alpha$ Web angle
$\beta$ Outer flange angle
  Inner flange angle

What is claimed is:

1. A circumferential stiffener configured for a fuselage of an aircraft, the circumferential stiffener comprising:
    a stiffening profile comprising:
        a web disposed at an angle to a normal axis of the circumferential stiffener;
        at least one inner flange;
        at least one outer flange; and
    an integral angle profile including a foot plate configured for connection to a skin section of the fuselage and an arm which extends away from the foot plate to a free end section, wherein the free end section translates integrally into the stiffening profile such that the stiffening profile is configured to be spaced away from the skin of the fuselage, and
    wherein a shear center of the circumferential stiffener, as viewed from a lateral direction of the aircraft, is positioned between a surface center of gravity of the foot plate and a surface center of gravity of the web.

2. An aircraft comprising the circumferential stiffener recited in claim 1, wherein the aircraft is an aeroplane.

3. The circumferential stiffener recited in claim 1, wherein each of the flanges is disposed at an angle to the web that differs from 90°.

4. The circumferential stiffener recited in claim 1, wherein the flanges are configured to extend parallel to the skin section.

5. The circumferential stiffener recited in claim 1, wherein the at least one inner flange extends in an opposite direction from the at least one outer flange.

6. The circumferential stiffener recited in claim 1, wherein at least two of the flanges have differing lengths.

7. The circumferential stiffener recited in claim 1, wherein the flanges have identical thicknesses.

8. The circumferential stiffener recited in claim 1, wherein the arm extends orthogonally from the foot plate at a right angle and the web is disposed at an angle in a direction away from the foot plate.

9. The circumferential stiffener recited in claim 1, wherein the circumferential stiffener is asymmetric.

* * * * *